United States Patent [19]

Patella et al.

[11] 4,113,540
[45] Sep. 12, 1978

[54] USE OF MULTIFUNCTIONAL MONOMERS IN THE PREPARATIONS OF EMULSIONS TO BE USED IN ADHESIVES

[75] Inventors: Ralph F. Patella, South Plainfield; Edward J. Kuzma, Woodbridge, both of N.J.

[73] Assignee: Celanese Corporation, New York, N.Y.

[21] Appl. No.: 856,829

[22] Filed: Dec. 2, 1977

Related U.S. Application Data

[63] Continuation of Ser. No. 760,879, Jan. 21, 1977, abandoned.

[51] Int. Cl.² .............................................. C09J 3/12
[52] U.S. Cl. .............................. 156/327; 260/29.6 T; 526/326
[58] Field of Search .................. 260/29.6 T; 526/326; 156/327

[56] References Cited

U.S. PATENT DOCUMENTS

| 3,423,352 | 1/1969 | Levine et al. | 526/210 |
| 3,423,353 | 1/1969 | Levine et al. | 526/210 |
| 3,637,563 | 1/1972 | Christena | 260/8 |
| 3,755,237 | 8/1973 | Issacs et al. | 526/248 |
| 3,925,289 | 12/1975 | Sakato et al. | 260/29.6 BE |
| 4,056,503 | 11/1977 | Powanda et al. | 260/29.6 T |

Primary Examiner—Eugene C. Rzucidlo
Attorney, Agent, or Firm—John A. Shedden

[57] ABSTRACT

This invention relates to novel adhesive compositions and laminates produced therefrom, said adhesive comprising a vinyl acetate-acrylate or methacrylate emulsion polymer with a content of an ethylenically unsaturated acid ester of a polyol containing at least three hydroxyl groups, said ester should also include at least three unsaturated acid moieties.

5 Claims, No Drawings

USE OF MULTIFUNCTIONAL MONOMERS IN THE PREPARATIONS OF EMULSIONS TO BE USED IN ADHESIVES

This is a continuation of application Ser. No. 760,879, filed Jan. 21, 1977, now abandoned.

This invention relates to novel adhesive compositions and laminates produced therewith.

CROSS REFERENCE

Commonly assigned copending application Ser. No. 733,632, now U.S. Pat. No. 4,056,503.

Latex emulsion polymers are used extensively for binding metal, wood and plastics to a variety of substrates. Most commonly the latex emulsion polymers comprise copolymers of vinyl acetate with varied comonomers such as ethylene, vinyl or vinylidene chloride, vinyl ethers, and esters of unsaturated acids such as acrylic and methacrylic acid esters, e.g. butyl acrylate, ethyl acrylate and the like. U.S. Pat. No. 3,755,237 describes vinyl acetate-alpha olefin copolymer compositions useful as adhesives, the said copolymers including termonomers at a level of 0.1–25 weight percent. The termonomers described include crosslinking agents such as diethylene glycol diacrylate and trimethylol propane triacrylate which are used at levels less than 1% by weight of the comonomer. U.S. Pat. No. 3,925,289 describes adhesive compositions comprised of vinyl acetate polymer containing 0–90% polyvinyl alcohol together with a multifunctional compound, e.g. ethylene dimethacrylate, at a level of 1–30% by weight, and a persulfate.

Among the leading commercially available adhesive products presently available are ethylene-vinyl acetate copolymers which are known for their superior bonding strength.

In general, adhesive products as with paints are comprised of the latex emulsion reaction mixture in which the latex emulsion is prepared, with optional adjustment of solids content. If desired, the product may be separated from the reaction mixture and re-dispersed in emulsion form at any desired levels of solid content.

It has now been surprisingly found that emulsion polymers comprising vinyl acetate and an acrylate ester and containing certain multifunctional monomers as hereinafter specified, have unusually superior adhesive properties compared to present commercially available adhesive products, e.g. ethylene-vinyl acetate adhesive products.

The multifunctional monomers of the present new compositions are $\alpha,\beta$-ethylenically unsaturated carboxylic acid esters of polyols, the polyols containing at least three hydroxy groups, the esters containing at least three unsaturated acid moieties. Exemplary of such acids are acrylic, methacrylic and homologous acids thereof, and the polyols include, for example, glycerol; 1,2,4-butanetriol; pentaerylthritol; dipentaerythritol; tripentaerythritol; trimethylolpropane; trimethylolethane; sorbitol; and the like.

The emulsion polymers of the present new adhesive products of this invention are comprised of vinyl acetate and an acrylate ester together with an $\alpha,\beta$-unsaturated acid ester of a polyol of at least three hydroxy groups, the ester containing at least three unsaturated acid moieties, i.e. at least three hydroxy groups of the polyol are esterified with the unsaturated acid. Thus the present new adhesives comprise terpolymers of vinyl acetate and acrylate, or methacrylate, esters in which the termonomer is the said unsaturated acid ester of a polyol. The terpolymers should contain at least about 2% by weight, and preferably at least about 4% by weight of the termonomer. The preferred terpolymers contain from about 2% to about 10% and most preferably from about 4% to about 10%, of the termonomer.

DESCRIPTION OF PREFERRED EMBODIMENTS

The preferred multifunctional polyol derivatives are acrylic acid or methacrylic acid esters of the selected polyol in which at least three hydroxy groups are esterified. Exemplary preferred compounds include: glycerol triacrylate, 1,2,4-butanetriol trimethacrylate, pentaerythritol tri- and tetra-acrylate and methacrylate, dipentaerythritol hexacrylate, tripentaerythritol hexacrylate, tripentaerythritol octaacrylate, trimethylolpropane triacrylate, trimethylolethane triacrylate, sorbitol hexacrylate, and the like, including mixtures in all proportions.

The multifunctional polyol derivatives can be employed at a level of at least about 2% and preferably at least about 4% and up to 10% by weight, although larger amounts can be used. However, when high levels of the derivative are used, care should be taken to avoid gelation of the reaction mixture. A minimum of experimentation will dictate the optimum effective levels of the polyol derivative in any particular latex polymer preparation and is within the skill of the art. As is evident, the level at which gelation will occur is dependent upon the number of unsaturated acyl groups contained in the polyol derivative, as well as the process conditions employed in the preparation of the latex product.

The preferred emulsion polymers are comprised of vinyl acetate and an acrylate, or methacrylate, ester, in addition to the aforesaid multifunctional polyol derivative. Generally, the amount of acrylate, or methacrylate, ester will range from about 5% to 50% by weight and preferably from about 10% to about 30% by weight based on the total weight of vinyl acetate and acrylate monomers. It is usually preferable to employ the acrylate ester at a level below about 25%, with the vinyl acetate comprising at least 75% of total weight of vinyl acetate and acrylate monomers. Effective levels of the acrylate lie in the range of 5% to 25%, with 10% to 20% being most preferred. When the acrylate level is more than 25%, the plasticizing action thereof renders the copolymer somewhat soft and may require the use of the multifunctional polyol derivative at substantially higher levels to achieve the levels of bonding strength normally attainable with the preferred vinyl acetate-acrylate ratios. Exemplary acrylates include methyl acrylate, ethyl acrylate, 2-ethylhexyl acrylate, methyl methacrylate, ethyl methacrylate, n-propyl methacrylate and isobutyl methacrylate.

The procedures used to prepare the new polymer emulsions of this invention generally involve admixing under rapid stirring the monomer charge with water, surfactants or emulsifying agent, a polymerization catalyst or initiator, and, in most cases, a protective colloid-forming substance. The mixture is then heated to polymerization temperature for the time required to substantially complete the emulsion polymer formation. Many variations of the general preparative procedure are used to obtain, for example, lower viscosity, high solids content, improved freeze-thaw stability, etc. These variations include, for example, the use of a pre-emulsion technique (see U.S. Pat. No. 3,637,563) in which the monomer charge is first emulsified in water using a surfactant or emulsifying agent, and then the pre-emulsion is added to the reaction mixture which contains the remaining reactants; intermediate addition of surfactant to the polymerization reaction mixture during the polymerization (see U.S. Pat. No. 3,423,352); and addition of a water-soluble free radical initiator to a substantially completely polymerized emulsion and reacting further to reduce the viscosity of the emulsion (see U.S. Pat. No. 3,423,353).

For the present new emulsion polymers, it is preferred to add the monomer mixture, including the multifunctional polyol derivative, to an aqueous surfactant-containing solution with adequate stirring to obtain a stable pre-emulsion which is then added to the polymerization reaction medium containing the catalyst and pre-heated to reaction temperature. The addition of the pre-emulsion of comonomers is regulated to allow control over the polymerization. In general, the rate of addition of the pre-emulsion is usually such that at least 1 hour and usually 2 hours and more are required for the total addition. In all cases, the rates of addition of reactants are controlled to permit regulation of the reaction temperature to below 100° C. and preferably not higher than about 75° C. After the addition of monomer charge, it is usually preferred to add a minor amount of catalyst and continue heating the mixture to assure complete reaction of all monomers. This latter step is to avoid detectable monomer odor in the product when intended for coating uses.

The surfactants, or emulsifying agents employed can be any of the anionic, cationic or non-ionic materials, commonly employed, as well as mixtures thereof, provided that preferably, a predominant amount of surfactant, i.e. at least 50% based on total weight of surfactant used, and usually all of the surfactant, contains at least four ether linkages. The surfactants are normally employed at levels of from about 1% to about 10% of the weight of total monomers present.

A particularly preferred class of polyether surfactants or emulsifying agents encompasses ethylene oxide and propylene oxide condensates in general, e.g., straight and branched-chain alkyl and alkylaryl polyethylene glycol and polypropylene glycol ethers and thioethers and more particularly substances such as the "Igepals", which are members of a homologous series of alklphenoxypoly (ethyleneoxy) ethanols, which series can be represented by the general formula

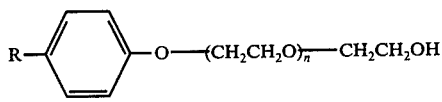

wherein R represents an alkyl radical and $n$ represents the number of mols of ethylene oxide employed, included among which are alkylphenoxypoly (ethyleneoxy) ethanols having alkyl groups containing from about 7 to about 18 carbon atoms, inclusive, and having from about 4 to about 100 ethyleneoxy units, such as the heptylphenoxypoly (ethyleneoxy) ethanols, nonylphenoxypoly (ethyleneoxy) ethanols and dodecylphenoxypoly (ethyleneoxy) ethanols; the sodium, potassium or ammonium salts of the sulfate esters of these alkylphenoxypoly (ethyleneoxy) ethanols; alkylpoly (ethyleneoxy) ethanols; alkylpoly (propyleneoxy) ethanols; octylphenoxyethoxy ethyldimethylbenzylammonium chloride; polyethylene glycol t-dodecylthioether; the "Tweens," which are polyoxyalkylene derivatives of hexitol (including sorbitans, sorbides, mannitans and mannides) anhydride partial long-chain fatty acid esters, such as the polyoxyalkylene derivatives of sorbitan monolaurate, sorbitan monopalmitate, sorbitan monostearate, sorbitan tristearate, sorbitan monooleate and sorbitan trioleate, the "Pluronics," which are condensates of ethylene oxide with a hydrophobic base, formed by condensing propylene oxide with propylene glycol, and the like.

As previously indicated, a protective colloid-forming substance is generally employed, and will usually contain at least one ether linkage, and preferably a plurality thereof. Included among such ether linkage-containing materials are hydroxymethyl cellulose, hydroxyethyl cellulose, ethyl hydroxyethyl cellulose, ethoxylated starch derivatives, and the like. However, other protective colloid-forming substances, i.e., ones containing no ether linkages, can also be used either alone or together with said ether linkage-containing materials, and included among these are partially and fully hydrolyzed polyvinyl alcohols, natural and synthetic gums, such as gum tragacanth and gum arabic, polyacrylic acid, poly (methyl vinyl ether/maleic anhydride), and the like. All of these materials will be used in the amounts found in conventional emulsion polymerization procedures (generally from about 0.1% to about 2% by weight, based on the total weight of the emulsion).

The emulsified monomer mixture is polymerized in the usual manner, i.e., by means of a catalytic amount of a conventional free radical polymerization catalyst or catalyst system (which can also be referred to as an addition polymerization catalyst, a vinyl polymerization catalyst or a polymerization initiator), with the proviso that the catalyst or catalyst system be substantially water soluble. An illustrative but by no means exhaustive enumeration of such catalysts includes inorganic peroxides such as hydrogen peroxide, sodium perchlorate and sodium perborate, inorganic persulfates such as sodium persulfate, potassium persulfate and ammonium persulfate, and redox systems such as sodium metabisulfite-potassium persulfate, and the like.

The particular catalyst or catalyst system employed initially can generally be used in amounts ranging from about 0.01% to about 3% by weight, based on the total weight of monomer present.

The molecular weights of the present new emulsion polymers are higher than otherwise identical polymers without the multifunctional monomer present.

The lower viscosities of the present new emulsion polymers make it possible to obtain high solids content. This is particularly advantageous since the use of sophisticated equipment and/or techniques normally required for high solids content emulsions can be alleviated in the processing of the emulsions into commercial coating products.

The emulsion polymers are conveniently used as adhesives in the form of the reaction mixture produced in the preparation thereof. The emulsions can be directly applied to the surface of substrates to be bonded together usually in the form of a thin film, preferably evenly applied, and the coated surfaces are bonded together e.g. by application of pressure to the resulting laminate comprised of the initial substrates bonded through the layer of applied adhesive. It is not essential to coat the surfaces of both substrates since sufficient bonding can be realized by application to only one of the respective surfaces. The method of pressure-contact of the surfaces of the substrates to be bonded can be any of those commonly employed. For example, the adhesive can be spread over large surfaces with rollers or similar applicators, the substrates are assembled and then pressed, hot or cold. Alternatively, the substrates can be clamped until the desired degree of bonding occurs.

Using the new adhesive compositions of this invention, laminates of exceedingly high strength can be prepared, e.g. fiber boards, laminated woods, fancy plywood, furniture articles, paper articles such as bags and corrugated boxes, non-woven fabrics, cloth articles, leather goods, and the like.

The following Examples are provided to further illustrate the invention.

EXAMPLE 1

A series of emulsion polymers are prepared using the following procedure:

1. Prepare a solution of Igepal CA-897 and Triton X-200 in 100-ml of the total water in a 1000-ml. beaker using adequate agitation.
2. Pour 268.37 g of water and 2.0 g of Natrosol 180 LR into a 2000-ml. four-neck reaction flask. Heat for ½ hour at 65° C. by means of an external water bath.
3. Prepare a mixture of the vinyl acetate, butyl acrylate, multifunctional monomers, and tertiary butyl hydroperoxide in a suitable container. Stir well with spatula for adequate blending.
4. Pour the monomer blend slowly into the solution prepared in Step 1 (with adequate agitation) to obtain a stable pre-emulsion. Place the pre-emulsion in a 1000-ml. graduated dropping funnel and hold for delayed addition to the reactor.
5. Dissolve the Hyrozin in 58 ml. of water. Hold for delayed addition.
6. Dissolve 0.05 g sodium persulfate in 10 cc of water. Hold for initial addition.
7. When the contents of the reaction flask (Step 2) have been heated to 65° C. for ½ hour, add to the flask the sodium persulfate solution and 8 cc of the Hydrozin solution. Stir for 5 minutes.
8. Start the addition of the pre-emulsion. Polymerization should occur at once as evidenced by the blue color of the contents in the reaction flask.
9. Schedule the pre-emulsion for a 150 minute addition period.
10. Start the addition of the Hydrozin solution and schedule for 2 hours and 40 minutes.
11. Do not allow the reaction temperature to exceed 70°-71° C.
12. At the completion of the pre-emulsion and Hydrozin feeds, allow the reaction temperature to dissipate until it equals the water bath temperature.
13. Hold for 1 hour at 65° C. and then cool to room temperature.

Igepal CA — 879 — homologous nonylphenoxypoly (ethylene-oxy) ethanol; (Antara Chemicals).

Triton XI — 200I — water soluble surfactant based on alkaryl polether alcohols, sulfonates and sulfates (Rohm and Haas).

Hydrozin — zinc formaldehyde sulfoxylate (Nopco Chemicals Co.).

Natrosol — 180 LR — Hydroxyethyl cellulose (Hercules Inc.).

The Inherent Viscosity is determined at 25° C. by establishing a 0.2% solids solution in 80% acetic acid.

The Thixotropic Index is determined on a Brookfield Viscometer by taking the largest spindle which will give a reading on the scale at 200 rpm and recording the viscosity at 20, 40, 100 and 200 rpm; starting at the lowest and going to the highest speed.

The Index is calculated as follows:

$$\text{Thixotropic Index} = (V_H/V_L) = (2V_{200} - V_{100})/(2V_{40} - V_{20})$$

where $V_{200}$ is the viscosity at 200 rpm, etc.

(Note: MFFT = Minimum Film Forming Temperature)

The results are given in Table I.

TABLE 1

| FORMULATION | (Control) | A (4%) | B (8%) | C (4%) | D (5%) |
|---|---|---|---|---|---|
| Vinyl Acetate | 450.50 | 432.48 | 414.46 | 432.48 | 432.48 |
| Butyl Acrylate | 79.50 | 76.32 | 73.14 | 76.32 | 76.32 |
| Pentaerythritol Triacrylate | — | 21.20 | 42.40 | — | — |
| Hexanediol Diacrylate | — | — | — | 21.20 | — |
| Trimethylolpropane Triacrylate | — | — | — | — | 21.20 |
| Igepal CA-897 | 27.00 | 27.00 | 27.00 | 27.00 | 27.00 |
| Triton X-200 | 3.00 | 3.00 | 3.00 | 3.00 | 3.00 |
| Tertiary Butyl Hydroperoxide (90%) | 0.90 | 0.90 | 0.90 | 0.90 | 0.90 |
| Sodium Persulfate | 0.05 | 0.05 | 0.05 | 0.05 | 0.05 |
| Hydrozin | 0.68 | 0.68 | 0.68 | 0.68 | 0.68 |
| Natrosol 180 LR | 2.00 | 2.00 | 2.00 | 2.00 | 2.00 |
| Total Water | 436.37 | 436.37 | 436.37 | 436.37 | 436.37 |
| PROPERTIES | | | | | |
| Viscosity (cps) | 2025 | 1975 | 1450 | 1800 | 1800 |
| % Solids | 53.0 | 53.5 | 53.8 | 54.0 | 53.9 |
| pH | 4.0 | 4.2 | 4.0 | 4.1 | 3.9 |
| Grit (ppm) | 219 | Not run | 187 | Not run | Not run |
| MFFT, ° F | 60 | 68 | 92 | 65 | 68 |
| T.I. | 0.39 | 0.39 | 0.43 | 0.42 | 0.37 |
| Freeze/Thaw | Fail | Fail | Fail | Fail | Fail |
| I.V. | 0.60 | 0.91 | 1.05 | 1.09 | 0.83 |

| FORMULATION | E (8%) | F (4%) | G (8%) | H (4%) | I (8%) |
|---|---|---|---|---|---|
| Vinyl Acetate | 414.46 | 432.48 | 414.46 | 432.48 | 414.46 |
| Butyl Acrylate | 73.14 | 76.32 | 73.14 | 76.32 | 73.14 |
| Trimethylolpropane Triacrylate | 42.40 | — | — | — | — |

TABLE 1-continued

| FORMULATION | (Control) | A (4%) | B (8%) | C (4%) | D (5%) |
|---|---|---|---|---|---|
| PETA/HDODA (50/50) | — | 21.20 | 42.40 | — | — |
| TMPTA/PETA (50/50) | — | — | — | 21.20 | 42.40 |
| Igepal CA-897 | 27.00 | 27.00 | 27.00 | 27.00 | 27.00 |
| Triton X-200 | 3.00 | 3.00 | 3.00 | 3.00 | 3.00 |
| Tertiary Butyl Hydroperoxide (90%) | 0.90 | 0.90 | 0.90 | 0.90 | 0.90 |
| Soldium Persulfate | 0.05 | 0.05 | 0.05 | 0.05 | 0.05 |
| Hydrozin | 0.68 | 0.68 | 0.68 | 0.68 | 0.68 |
| Natrosol 180 LR | 2.00 | 2.00 | 2.00 | 2.00 | 2.00 |
| Total Water | 436.37 | 436.37 | 436.37 | 436.37 | 436.37 |
| PROPERTIES | | | | | |
| Viscosity | 1800 | 2050 | 1600 | 2375 | 1525 |
| % Solids | 54.4 | 54.4 | 54.1 | 54.2 | 53.0 |
| pH | 4.0 | 4.0 | 4.1 | 4.2 | 4.0 |
| Grit (ppm) | 158 | Not run | Not run | Not run | Not run |
| MFFT, °F | 84 | 68 | 78 | 69 | 92 |
| T.I. | 0.43 | 0.44 | 0.47 | 0.45 | 0.42 |
| Freeze/Thaw | Fail | Fail | Fail | Fail | Fail |
| I.V. | 1.24 | 0.82 | 1.14 | 0.96 | 1.08 |

EXAMPLE 2

The adhesive preparation of the polymers produced in Example 1 are tested according to ASTM - D - 816 - 465:

1. Apply in 0.1 gm sample of emulsion polymers (55% solids) over 1 square inch area of 1 inch by 4 inch aluminum metal strips.
2. Place a 500 gm weight over the bonded strips at the point of contact and allow to stand for 24 hours at room temperature.
3. Place the bonded strips with a 500 gm weight suspended in an environmental chamber and maintain at 100° F. for 24 hours.
4. If failure does not occur, add an additional 500 gm weight and hold at 100° F. for another 24 hours.
5. If failure does not occur, subject the specimen to a temperature of 200° F. for a 100 hour period.
6. At the end of the 100 hour test the specimens were evaluated for tensile strength using an Instron Tester. The results are given in Table II.

TABLE II

| FORMULATION | Composition % | | | | 500 Gram Weight at 100° F | 1000 Gram Weight at 100° F | 1000 Gram Weight at 200° F | Instron PSI |
|---|---|---|---|---|---|---|---|---|
| | VA/BA | PETA | TMPTA | HDODA | | | | |
| Control | 85/15 | — | — | — | Passed 24 hrs | Passed 24 hrs | Failed 74 hrs | — |
| A | 85/15 | 4 | — | — | Passed 24 hrs | Passed 24 hrs | Passed 100 hrs | 1510 |
| B | 85/15 | 8 | — | — | Passed 24 hrs | Passed 24 hrs | Passed 100 hrs | 1170 |
| C | 85/15 | — | — | 4 | Passed 24 hrs | Passed 24 hrs | Failed 1 hr | — |
| D | 85/15 | — | 4 | — | Passed 24 hrs | Passed 24 hrs | Passed 100 hrs | 530 |
| E | 85/15 | — | 8 | — | Passed 24 hrs | Passed 24 hrs | Passed 100 hrs | 1110 |
| F | 85/15 | 2 | — | 2 | Passed 24 hrs | Passed 24 hrs | Failed 1 hr | — |
| G | 85/15 | 4 | — | 4 | Passed 24 hrs | Passed 24 hrs | Passed 100 hrs | 1060 |
| H | 85/15 | 2 | 2 | — | Passed 24 hrs | Passed 24 hrs | Failed 1 hr | — |
| I | 85/15 | 4 | 4 | — | Passed 24 hrs | Passed 24 hrs | Passed 100 hrs | 740 |
| Aircoflex 400 Ethylene VA | | | | | Passed 24 hrs | Passed 24 hrs | Passed 100 hrs | 370 |

Referring to Table II, Sample C is not within the scope of the present invention and is provided for comparison purposes. The multifunctional polyol is hexanediol diacrylate and the results obtained indicate the sample performance to be less than the control sample. Equally, when hexanediol diacrylate is incorporated with the multifunctional polyols of this invention, there is a diminution of the bond strength as exemplified in Samples F and G. Sample G is identical to Sample A excepting the presence of hexanediol diacrylate (4%) which reduces the tensile strength from 1510 (Sample A) to 1060 (Sample G). These results with hexanediol diacrylate indicate a negative role of the termonomer in affecting the adhesive properties of the texpolymer.

The tensile strength measurements are made on an Instron Tester which measures the pressure required to rupture the bond formed by the adhesives. Aircoflex 400 is an ethylene vinyl acetate copolymer for adhesives made by Air Reduction Co./Airco Division.

In the foregoing Tables, the abbreviations employed correspond to the following compounds:
VA/BA = vinyl acetate/butyl acetate
DETA = pentaerythritol triacrylate
TMPTA = trimethylolpropane triacrylate
HDODA = hexanedioldiacrylate

What is claimed is:
1. A method of forming a laminate which comprises bonding at least two substrates with an adhesive composition comprising an emulsion polymer of vinyl acetate with from about 5% to about 50% by weight of alkyl acrylate or methacrylate based on the total weight of vinyl acetate and alkyl acrylate or methacrylate and from about 2% to about 10% by weight, based on the total weight of said polymer, of an acrylic or meth- acrylic acid ester of a polyol in which at least three hydroxyl groups are esterified.

2. The method of claim 1 wherein said polyol is trimethylolpropane.

3. The method of claim 1 wherein said polyol is pentaerythritol.

4. The method of claim 1 wherein said polyol ester is trimethylolpropane triacrylate.

5. The method of claim 1 wherein said polyol ester is pentaerythritol triacrylate.

* * * * *